United States Patent
Jerichow et al.

(10) Patent No.: US 11,032,699 B2
(45) Date of Patent: Jun. 8, 2021

(54) PRIVACY PROTECTION CAPABILITIES

(71) Applicant: Nokia Technologies Oy, Espoo (FI)

(72) Inventors: Anja Jerichow, Grafing (DE); Silke Holtmanns, Klaukkala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/613,207

(22) PCT Filed: May 14, 2018

(86) PCT No.: PCT/EP2018/062319
§ 371 (c)(1),
(2) Date: Nov. 13, 2019

(87) PCT Pub. No.: WO2018/210715
PCT Pub. Date: Nov. 22, 2018

(65) Prior Publication Data
US 2020/0186999 A1      Jun. 11, 2020

(30) Foreign Application Priority Data
May 16, 2017   (EP) ..................................... 17171399

(51) Int. Cl.
| H04W 12/02 | (2009.01) |
| H04L 29/06 | (2006.01) |
| H04W 8/18  | (2009.01) |
| H04W 12/04 | (2021.01) |
| H04W 12/72 | (2021.01) |

(52) U.S. Cl.
CPC ......... *H04W 12/02* (2013.01); *H04L 63/0414* (2013.01); *H04L 63/0428* (2013.01); *H04W 8/18* (2013.01); *H04W 12/04* (2013.01); *H04W 12/72* (2021.01)

(58) Field of Classification Search
CPC ....... H04L 63/205; H04L 63/06; H04L 63/20; H04W 12/0608; H04W 12/1202; H04W 12/00; H04W 12/0013; H04W 12/0017; H04W 12/0401; H04W 12/04033; H04W 12/0609; H04W 12/08; H04W 12/1204; H04W 12/06; H04W 12/02; H04W 12/72; H04W 12/069
See application file for complete search history.

(56) References Cited

U.S. PATENT DOCUMENTS

2013/0080779 A1   3/2013   Holtmanns et al.

FOREIGN PATENT DOCUMENTS

EP   1873998 A1   1/2008

OTHER PUBLICATIONS

"3rd Generation Partnership Project; Technical Specification Group Services and System Aspects; Study on the security aspects of the next generation system (Release 14)", 3GPP TR 33.899, V1.1.0 , Mar. 2017, pp. 1-494.

(Continued)

*Primary Examiner* — Nam T Huynh
(74) *Attorney, Agent, or Firm* — Alston & Bird LLP

(57) ABSTRACT

It is provided a method, comprising instructing a subscription device to indicate an applied privacy protection to a visited network; instructing the subscription device to provide a protected subscription identifier to the visited network, wherein the protected subscription identifier is based on a permanent subscription identifier protected according to the applied privacy protection.

12 Claims, 6 Drawing Sheets

S110
Receive indication on privacy protection

S120
Apply privacy protection to permanent identifier

(56) References Cited

OTHER PUBLICATIONS

"3rd Generation Partnership Project; Technical Specification Group Services and System Aspects; General Packet Radio Service (GPRS) enchancements for Evolved Universal Terrestrial Radio Access Network (E-UTRAN) access (Release 14)", 3GPP TS 23.401, V14.3.0, Mar. 2017, pp. 1-386.

"3rd Generation Partnership Project; Technical Specification Group Services and System Aspects; IP Multimedia Subsystem (IMS); Stage 2 (Release 14)", 3GPP TS 23.228, V14.3.0, Mar. 2017, pp. 1-321.

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 14)", 3GPP TS 29.272, V14.3.0, Mar. 2017, pp. 1-162.

"3rd Generation Partnership Project; Technical Specification Group Core Network and Terminals; Mobile Application Part (MAP) specification (Release 14)", 3GPP TS 29.002, V14.3.0, Mar. 2017, pp. 1-1021.

Extended European Search Report received for corresponding European Patent Application No. 17171399.3, dated Nov. 20, 2017, 9 pages.

"3rd Generation Partnership Project; Technical Specification Group Services and System Aspects; Study on the security aspects of the next generation system (Release 14)", 3GPP TR 33.899, V1.3.0, Aug. 2017, 605 pages.

International Search Report and Written Opinion received for corresponding Patent Cooperation Treaty Application No. PCT/EP2018/062319, dated Aug. 6, 2018, 12 pages.

"3rd Generation Partnership Project; Technical Specification Group Services and System Aspects; Security architecture and procedures for 5G system (Release 15)", 3GPP TS 33.501, V15.4.0, Mar. 2019, pp. 1-187.

Office action received for corresponding European Patent Application No. 17171399.3, dated Aug. 27, 2020, 5 pages.

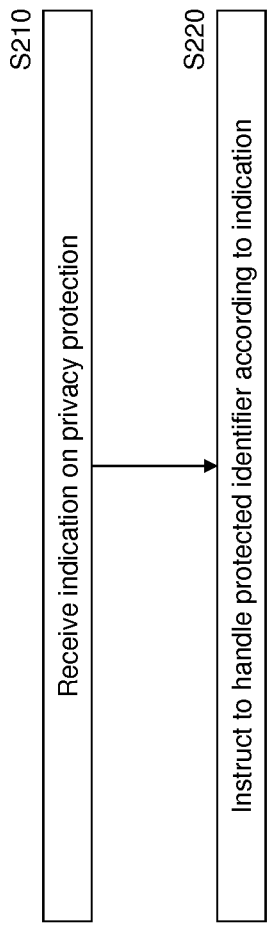
Fig. 9
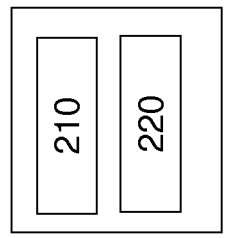
Fig. 8
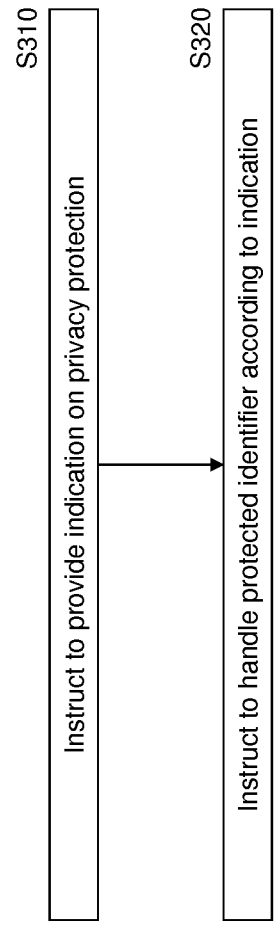
Fig. 11
Fig. 10

PRIVACY PROTECTION CAPABILITIES

RELATED APPLICATION

This application was originally filed as PCT Application No. PCT/EP2018/062319, filed on May 14, 2018, which claims priority from EP Patent Application No. 17171399.3, filed on May 16, 2017.

FIELD OF THE INVENTION

The present invention relates to an apparatus, a method, and a computer program product related to privacy protection.

ABBREVIATIONS

2G/3G/4G/5G $2^{nd}/3^{rd}/4^{th}/5^{th}$ Generation
3GPP $3^{rd}$ Generation Partnership Project
AIA Authentication Information Answer
AIR Authentication Information Request
AMF Authentication Management Field
ARPF Authentication Credential Repository and Processing Function
  AuC Authentication Center
  AUSF Authentication Server Function
  AV Authentication Vector
  AVP Attribute Value Pair
  BSS Base Station Subsystem
  CSCF Call Session Control Function
  eNB evolved NodeB
  gNB Next generation NodeB
  HLR Home Location Register
  HN Home Network
  HPLMN Home PLMN
  HSS Home Subscriber Server
  I-CSCF Interrogating CSCF
  IE Information Element
  IMPI IP Multimedia Private Identity
  IMPU IP Multimedia PUblic Identity
  IMS IP Multimedia Subsystem
  IMSI International Mobile Subscriber Identity
  IP Internet Protocol
  LTE Long Term Evolution
  MAP Mobile Application Part
  MCC Mobile Country Code
  MME Mobility Management Entity
  MNC Mobile Network Code
  MS Mobile Station
  MSC Mobile Switching Center
  MSIN MS Identification Number
  MTC Machine Type Communication
  P-CSCF Proxy CSCF
  PLMN Public Land Mobile Network
  SA System Architecture
  S-CSCF Serving CSCF
  SEAF Security Anchor Function
  S-GW Serving Gateway
  SIM Subscriber Identity Module
  SLF Subscription Locator Function
  SMS Short Message Service
  SMSC SMS Center
  SN Serving Network
  SS7 Signalling System #7
  SUPI Subscriber Permanent Identifier
  TR Technical Report
  TS Technical Specification
  UDM Unified Data Management
  UE User Equipment
  UICC Universal Integrated Circuit Card
  ULR Update Location Request
  USIM Universal Subscriber Identity Module
  VLR Visiting Location Register
  VPLMN Visited PLMN

BACKGROUND OF THE INVENTION

Privacy of subscription identifiers when communicating over the air has been a big issue for 2G/3G/4G. Efforts are taken that this is solved in 5G.

The general need to hide the permanent identity better than today also stems from the SS7 hacking (e.g. mobile banking password hacking, eavesdropping, location tracking etc). Where entities like the US Federal Communication Commission and the Department of Homeland Security now push for better protection. In those attacks, the first step an attacker needs to take is to obtain the subscription identity of a user i.e. the International Mobile Subscriber Identity (IMSI). The IMSI can be obtained via different means. Operators now deploy firewalls and SMS routers to stop "IMSI" leaking via SS7 or Interconnection networks, but that means that attackers will look for other ways to get the IMSI. Also, attackers may have "harvested" many IMSIs for later usage. Privacy protection (e.g. pseudonym usage) makes identifier phishing harder for attackers and reduces therefore the possibility for a follow-up attack.

3GPP TR 33.899 describes several solutions to gain privacy over the air that can be roughly grouped in 3 solution classes.

Pseudonym solutions based on symmetric crypto systems:
  Demands HSS to map a changing pseudonym to the permanent subscription identifier.
  In pseudonym solution, the visited network would transparently forward the pseudonym to the home network for request of authentication vectors.
  Encryption of the permanent subscription identifier using the public key of the home operator:
  In the home network public key based solution, the home operator provides its public key to all home network subscribers. They will use it to encrypt the subscriber identity, which is the MSIN part of IMSI. Only the MSIN part needs to be encrypted, because MNC+MCC is needed by the serving network to route to the correct home network. Only the home HSS can decrypt the message because it possesses the private key. Once IMSI is identified, HSS/AuC will create AVs (authentication vectors) based on the distinct shared root key K between a user and the HSS/AuC. Similarly, in 5G core the UDM/ARPF creates the AV's requested via AUSF. AUSF and UDM could be co-located for optimization reasons.
  Encryption of the permanent subscription identifier using the public key of the serving operator:
  In this solution, the visited network needs to first decrypt the identity before starting the authentication and key agreement procedure in cooperation with the home network.
  Combination of home network public key based solution with pseudonym or serving network solutions with attribute- or identity-based encryption is possible using trust authorities or key management systems for providing the keys.

Currently all 3 solution classes have supporters, it is unclear which of them will be the final solution for 5G because 3GPP TR33.899 is not a normative document, but a study on potential approaches. It seems to be unlikely to get agreement on a single solution only.

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to at least perform instructing a subscription device to indicate an applied privacy protection to a visited network; instructing the subscription device to provide a protected subscription identifier to the visited network, wherein the protected subscription identifier is based on a permanent subscription identifier protected according to the applied privacy protection.

The at least one processor, with the at least one memory and the computer program code, may be arranged to cause the apparatus to further perform receiving a capability indication indicating that the visited network is capable of applying one or more privacy protections; checking if the subscription device is capable of applying at least one of the one or more privacy protections; if the subscription device is capable of applying at least one of the one or more privacy protections, selecting one of the one or more privacy protections which the subscription device is capable of as the applied privacy protection.

According to a second aspect of the invention, there is provided an apparatus, comprising at least one processor, at least one memory including computer program code, and the at least one processor, with the at least one memory and the computer program code, being arranged to cause the apparatus to at least perform receiving an indication of an applied privacy protection from a visited network; instructing a subscription device to provide a protected subscription identifier to the visited network, wherein the protected subscription identifier is based on a permanent subscription identifier protected according to the applied privacy protection.

The at least one processor, with the at least one memory and the computer program code, may be arranged to cause the apparatus to further perform instructing the subscription device to provide a capability indication to the visited network, wherein the capability indication indicates one or more privacy protections the subscription device is capable of; the indication of the applied privacy protection is received from the visited network in response to the providing of the capability indication.

According to each of the first and second aspects, the protecting according to the applied privacy protection may comprise providing a pseudonym instead of the permanent subscription identifier.

According to each of the first and second aspects, the protecting according to the applied privacy protection may comprise encrypting the permanent subscription identifier by a key. Either the key may be received from the visited network or the key may be received from a home network.

According to a third aspect of the invention, there is provided an apparatus, comprising at least one processor, at least one memory including computer program code, and the at least one processor, with the at least one memory and the computer program code, being arranged to cause the apparatus to at least perform receiving a first indication of an applied privacy protection from a subscription device; instructing a mobility entity to handle a protected subscription identifier according to the applied privacy protection, wherein the protected subscription identifier is received from the subscription device.

The at least one processor, with the at least one memory and the computer program code, may be arranged to cause the apparatus to further perform instructing a mobility entity to provide a capability indication to the subscription device, wherein the capability indication indicates one or more privacy protections the mobility entity is capable of; the first indication of the applied privacy protection is received from the subscription device in response to the providing of the capability indication.

According to a fourth aspect of the invention, there is provided an apparatus, comprising at least one processor, at least one memory including computer program code, and the at least one processor, with the at least one memory and the computer program code, being arranged to cause the apparatus to at least perform instructing a mobility entity to provide a first indication of an applied privacy protection to a subscription device; instructing the mobility entity to handle a protected subscription identifier according to the applied privacy protection, wherein the protected subscription identifier is received from the subscription device.

The at least one processor, with the at least one memory and the computer program code, may be arranged to cause the apparatus to further perform receiving a capability indication from the subscription device, wherein the capability indication indicates one or more privacy protections the subscription device is capable of; checking if the mobility entity is capable of applying at least one of the one or more privacy protections; if the mobility entity is capable of at least one of the one or more privacy protections, selecting one of the one or more privacy protections which the mobility entity is capable of as the applied privacy protection.

According to each of the third and fourth aspects, the handling according to the selected privacy protection comprises determining a home subscription server indicated in the protected subscription identifier; forwarding the protected subscription identifier to the home subscription server.

According to each of the third and fourth aspects, the at least one processor, with the at least one memory and the computer program code, may be arranged to cause the apparatus to further perform instructing the mobility entity to forward a second indication of the applied privacy protection to the home subscription server.

According to each of the third and fourth aspects, the handling according to the applied privacy protection may comprise forwarding the protected subscription identifier to a predetermined visited subscription server.

According to a fifth aspect of the invention, there is provided an apparatus, comprising at least one processor, at least one memory including computer program code, and the at least one processor, with the at least one memory and the computer program code, being arranged to cause the apparatus to at least perform receiving a protected subscription identifier and an indication of an applied privacy protection; instructing a subscription server to generate a permanent subscription identifier from the protected subscription identifier according to the applied privacy protection; instructing the subscription server to retrieve data from a database based on the permanent subscription identifier.

The generating according to the applied privacy protection may comprise at least one of replacing the protected subscription identifier by the permanent subscription identifier based on a stored mapping relationship and decrypting the protected subscription identifier by a key known to the subscription server.

According to a sixth aspect of the invention, there is provided a method, comprising instructing a subscription device to indicate an applied privacy protection to a visited network; instructing the subscription device to provide a protected subscription identifier to the visited network, wherein the protected subscription identifier is based on a permanent subscription identifier protected according to the applied privacy protection.

The method may further comprise receiving a capability indication indicating that the visited network is capable of applying one or more privacy protections; checking if the subscription device is capable of applying at least one of the one or more privacy protections; if the subscription device is capable of applying at least one of the one or more privacy protections, selecting one of the one or more privacy protections which the subscription device is capable of as the applied privacy protection.

According to a seventh aspect of the invention, there is provided a method, comprising receiving an indication of an applied privacy protection from a visited network; instructing a subscription device to provide a protected subscription identifier to the visited network, wherein the protected subscription identifier is based on a permanent subscription identifier protected according to the applied privacy protection.

The method may further comprise instructing the subscription device to provide a capability indication to the visited network, wherein the capability indication indicates one or more privacy protections the subscription device is capable of; the indication of the applied privacy protection is received from the visited network in response to the providing of the capability indication.

According to each of the sixth and seventh aspects, the protecting according to the applied privacy protection may comprise providing a pseudonym instead of the permanent subscription identifier.

According to each of the sixth and seventh aspects, the protecting according to the applied privacy protection may comprise encrypting the permanent subscription identifier by a key. Either the key may be received from the visited network or the key may be received from a home network.

According to an eighth aspect of the invention, there is provided a method, comprising receiving a first indication of an applied privacy protection from a subscription device; instructing a mobility entity to handle a protected subscription identifier according to the applied privacy protection, wherein the protected subscription identifier is received from the subscription device.

The method may further comprise instructing a mobility entity to provide a capability indication to the subscription device, wherein the capability indication indicates one or more privacy protections the mobility entity is capable of; the first indication of the applied privacy protection is received from the subscription device in response to the providing of the capability indication.

According to a ninth aspect of the invention, there is provided a method, comprising instructing a mobility entity to provide a first indication of an applied privacy protection to a subscription device; instructing the mobility entity to handle a protected subscription identifier according to the applied privacy protection, wherein the protected subscription identifier is received from the subscription device.

The method may further comprise receiving a capability indication from the subscription device, wherein the capability indication indicates one or more privacy protections the subscription device is capable of; checking if the mobility entity is capable of applying at least one of the one or more privacy protections; if the mobility entity is capable of at least one of the one or more privacy protections, selecting one of the one or more privacy protections which the mobility entity is capable of as the applied privacy protection.

According to each of the eighth and ninth aspects, the handling according to the selected privacy protection comprises determining a home subscription server indicated in the protected subscription identifier; forwarding the protected subscription identifier to the home subscription server.

According to each of the eighth and ninth aspects, the at least one processor, with the at least one memory and the computer program code, may be arranged to cause the apparatus to further perform instructing the mobility entity to forward a second indication of the applied privacy protection to the home subscription server.

According to each of the eighth and ninth aspects, the handling according to the applied privacy protection may comprise forwarding the protected subscription identifier to a predetermined visited subscription server.

According to a tenth aspect of the invention, there is provided a method, comprising receiving a protected subscription identifier and an indication of an applied privacy protection; instructing a subscription server to generate a permanent subscription identifier from the protected subscription identifier according to the applied privacy protection; instructing the subscription server to retrieve data from a database based on the permanent subscription identifier.

The generating according to the applied privacy protection may comprise at least one of replacing the protected subscription identifier by the permanent subscription identifier based on a stored mapping relationship and decrypting the protected subscription identifier by a key known to the subscription server.

Each of the methods according to the sixth to tenth aspects may be a method of providing privacy protection information.

According to an eleventh aspect of the invention, there is provided a computer program product comprising a set of instructions which, when executed on an apparatus, is configured to cause the apparatus to carry out the method according to any of the sixth to tenth aspects. The computer program product may be embodied as a computer-readable medium or directly loadable into a computer.

According to some embodiments of the invention, at least one of the following advantages may be achieved:
Flexibility with respect to the solution for protection of privacy of identifiers;
Allows a fast/efficient handling of a request comprising a protected identifier;
No impact on radio subsystem;
Applicable to many message exchanges including a UE identifier.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 8 shows an apparatus according to an embodiment of the invention;

FIG. 9 shows a method according to an embodiment of the invention;

FIG. 10 shows an apparatus according to an embodiment of the invention;

FIG. 11 shows a method according to an embodiment of the invention;

DETAILED DESCRIPTION OF CERTAIN EMBODIMENTS

Figure 1:
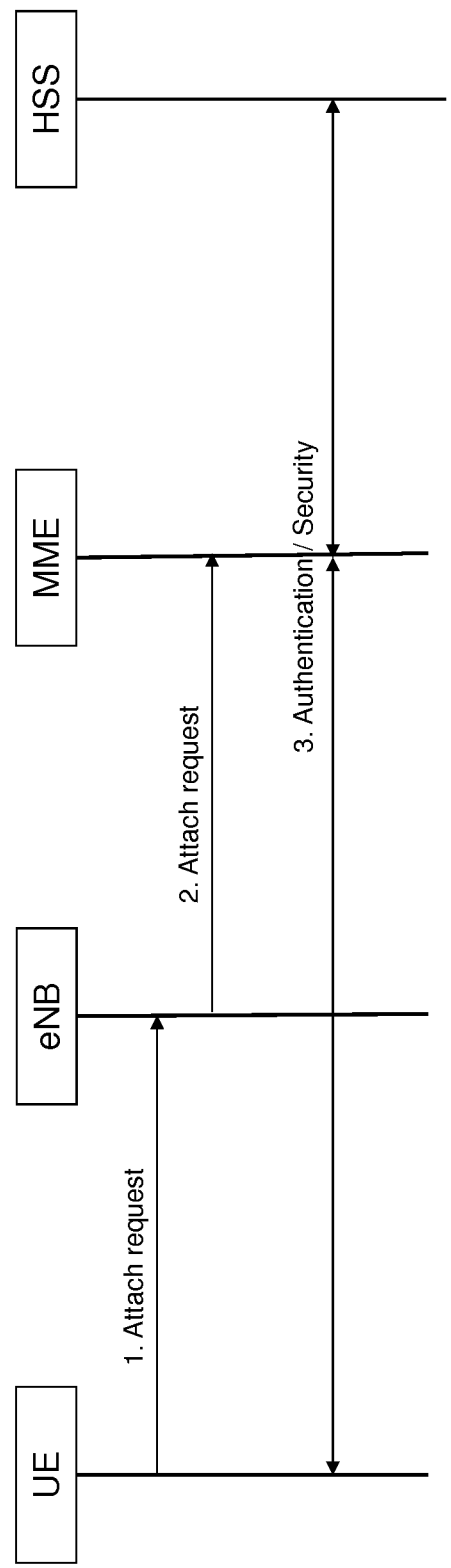
FIG. 1 shows an excerpt of an initial attach procedure according to 3GPP TS 23.401 (d-20), FIG. 5.3.2.1-1.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

As a potential way forward in 5G, several solutions may be allowed in phase 1 or its evolution, such that a single solution is not specified for the network side. I.e., it would be operator specific implementation based on the operator policy which of the solution its home network subscribers shall use. A 5G UE would preferably support all possible solutions in this case. The solution might be downloadable e.g. to the baseband chip or provided with an eUICC update.

In this case, the following problems are seen:
How would a visited network user know, which privacy method is in use?
How would the MME and HSS (running the authentication and key agreement) know how to behave?
There is the possibility, that 3GPP SA3 wants to support for flexibility on more than one single privacy protection solution, a UE may support several solutions (and maybe even non-listed ones to allow an operator the use of proprietary ones). Thus, the UE may indicate its privacy protection capabilities or at least the applied privacy protection. Also the network needs to deal with old and new phones and therefore needs to know what privacy protection the phone may or may not support, or what privacy protection was applied by the UE. In addition, to be future proof to enable new algorithms in the future a negotiation phase is a sensible thing, because that allows later easier integration of new algorithms and phasing out of old weaker algorithms.

In a scenario, a mobile phone pops up in a network and the MME is aware that this phone is there. The MME would need to understand for this inbound roamer, if the received identity is for processing by the serving network first (SN public key based solutions) or whether it is to be forwarded to the home network HSS directly (pseudonym/HN public key based solutions). If the user is from the MMEs own network, the MME still needs to decide what kind of "identity" it sees and what to do with it.

In a roaming scenario, the Home HSS (or HLR) would receive from the visited network a request for security credential (e.g. Authentication Information Request AIR from 3GPP TS29.272) or a location update. Those messages would contain the subscription identifier. If the subscription identifier is privacy protected then the receiving node HSS/HLR needs to know, if it is protected and how, that is, if the received identity is a pseudonym for mapping to the real subscription identifier or whether it needs to be decrypted first to access the subscription identifier. Hence, according to some embodiments, at least one of the credential request (e.g. AIR) and location update (e.g. diameter ULR or MAP location update) messages may comprise a new AVP (attribute value pair) that indicates which privacy protection mechanism is applied. Alternatively, at least one of the AIR and ULR messages may comprise an additional flag indicating the applied privacy protection mechanism and potentially needed parameters to apply the algorithms.

In some embodiments, if an operator has several HSS that can be reached via a SLF (subscription locator function), the SLF may have the understanding on the applied privacy protection mechanism (as described above for the HSS), such that the SLF is able to inform the MME to which server to turn his AIR or ULR request to.

That is, according to some embodiments of the invention, the UE indicates which privacy protection method is applied to protect the IMSI.

A conventional attach procedure is shown in FIG. 1, which is an excerpt of 3GPP TS 23.401. In steps 1 and 2, the UE requests, via eNodeB, to attach to the network represented by MME. Then, in step 3, HSS authenticates UE and provides security information such as an authentication vector.

In step 3 of FIG. 1a, conventionally, the IMSI is provided from the UE to MME and from there to HSS. In contrast to that, according to some embodiments of the invention, instead of the IMSI, a privacy protected IMSI is provided from UE to MME and from there to HSS.

According to some embodiments of the invention, a 5G UE announcing that a method is used for privacy protection may be preferable even in 4G networks. If the 4G HSS supports the feature of announcing the privacy protection, too, it could have 2 processing paths (one with privacy, one without). The path with privacy implemented in 4G may evaluate the announcement of the privacy protection method and may efficiently provide back the authentication vector in the AIA (authentication information answer message according to 3GPP TS 29.272).

This is one example, where the indication of privacy protection is useful even in a case where only one method of privacy protection is implemented, but which may or may not be applied.

The protected IMSI (also denoted as private IMSI or privacy protected IMSI, which results from applying the privacy protection to the permanent IMSI) would then need to be communicated to the S-GW and P-GW, so that the data matches between terminal and network nodes.

In some embodiments, the network may indicate to the UE its capability for privacy protection, such that the UE has to apply the privacy protection indicated by the network.

In some embodiments, UE and network may negotiate on the privacy protection to be applied (i.e. on the UE—network interface).

For example, the network may provide to the UE its preferred methods, similarly as done for negotiation of crypto protocols. In fact, privacy negotiation could become an additional information element (IE) in the security negotiation between UE and network entities. For example, network may indicate to UE its preferences for each of the supported privacy protection methods, and UE may select one of the privacy protections such that the "total preference" of the network and the UE is optimized. The "total preference" may be determined according to some metrics from the preferences of the network and the UE. The preferences may be predefined.

Correspondingly, the UE may indicate its preferences to the network, the network may determine a privacy protection with optimized "total preference", and inform the UE on the selected privacy protection. In embodiments where the network decides on the privacy protection to be applied, the UE may or may not indicate the applied privacy protection in the respective request message. However, e.g. the network element receiving the request (e.g. MME) may have to inform other involved network elements (such as HSS) on the applied privacy protection, if plural privacy protection methods may be applied at the other involved network element.

Then, the terminal may send, in the attach request, an indication on the applied privacy protection.

The UE may indicate the applied privacy protection in several ways.

For example, the UE may indicate one or more of the following:
  privacy processing (i.e. obtaining the permanent IMSI from the "protected identifier") to be done in SN;
  privacy processing to be done in HN;
  which privacy protection solution is used (a field with several entry possibilities—should be standardized, which one to be used for which method).

Some embodiments of the invention have the advantage subscription identifier privacy is enabled, usage of all solution classes is supported, and the privacy protection methods may be distinguished which allows a fast/efficient handling of a request.

For attach request and/o location update request, the evaluation of the indication of the applied privacy protection may be done in 5G MME (AMF/SEAF) and/or 5G HSS (AUSF/UDM). It may be transparent to eNB/gNB.

Figure 2:
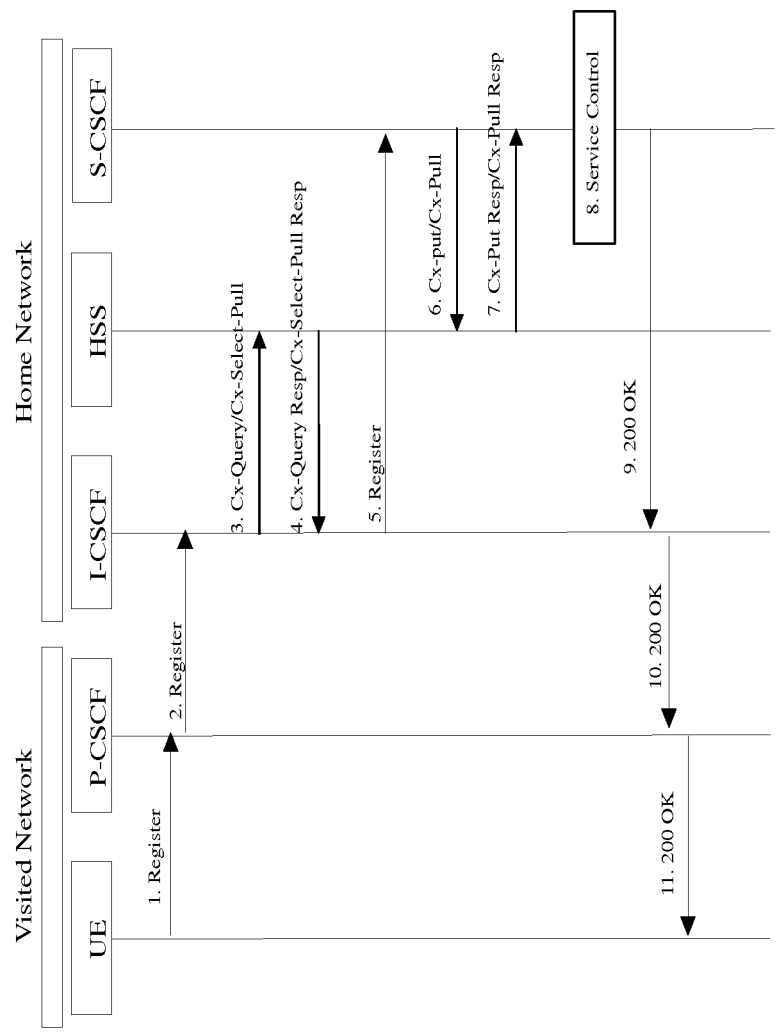
FIG. 2 shows a conventional IMS registration procedure according to 3GPP TS 23.228 (e-30), FIG. 5.1.
Figure 5:
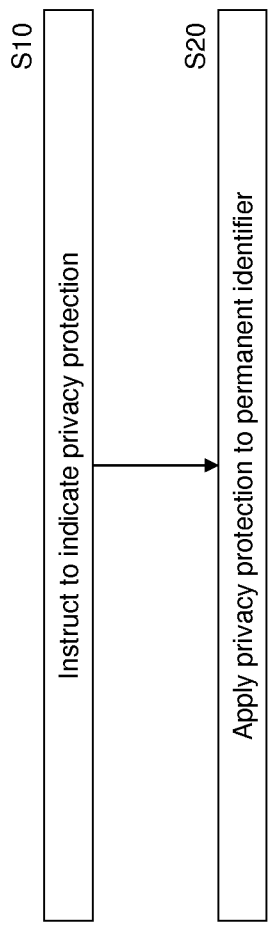
FIG. 5 shows a method according to an embodiment of the invention.

Embodiments of the invention are not restricted to AIR and ULR. Some embodiments of the invention may be applied to other message exchanges where an identity of the UE is exchanged. They are particularly useful if the identity is exchanged over a radio interface. Some examples are outlined below:

For IMS registration the situation is as follows. The basic IMS registration runs as shown in FIG. 2, taken from 3GPP TS 23.228 (FIG. 5.1). The IMPU is the public IMS identity (like MSISDN) and the IMPI corresponds "roughly" to the IMSI. Conventionally, the steps of a successful registration are substantially as follows:

1. After the UE has obtained IP connectivity, the UE sends the Register information flow to the P-CSCF, wherein the Register message comprises Public User Identity, Private User Identity, home network domain name, UE IP address, . . . .

2. Upon receipt of the register information flow, the P-CSCF sends the Register information flow to the I-CSCF with the following information: P-CSCF address/name, Public User Identity, Private User Identity, P-CSCF network identifier, UE IP address.

3. The I-CSCF shall send the Cx-Query/Cx-Select-Pull information flow to the HSS, wherein the query comprises Public User Identity, Private User Identity, P-CSCF network identifier.

The HSS shall indicate whether the user is allowed to register in that P-CSCF network.

4. Cx-Query Resp/Cx-Select-Pull Resp is sent from the HSS to the I-CSCF. It comprises an indication to the S-CSCF.

5. I-CSCF shall then send the register information flow comprising P-CSCF address/name, Public User Identity, Private User Identity, P-CSCF network identifier, UE IP address to the selected S-CSCF.

6. The S-CSCF shall send Cx-Put/Cx-Pull comprising Public User Identity, Private User Identity, S-CSCF name to the HSS.

7. The HSS shall return the information flow Cx-Put Resp/Cx-Pull Resp comprising user information to the S-CSCF. The user information passed from the HSS to the S-CSCF shall include one or more names/addresses information which can be used to access the platform(s) used for service control while the user is registered at this S-CSCF.

8. The S-CSCF shall send register information to the service control platform and perform whatever service control procedures are appropriate.

9 to 11 are corresponding ok messages.

According to some embodiments of the invention, the identity to be protected is the IMPI and the IMPU, if they are send together (e.g. in the Register steps 1, 2, and 5 of FIG. 2). Else there would be a permanent id (IMPU) to identify the private IMPI (i.e. the protected IMPI) and the attacker would then know the IMPI.

The indication of the applied privacy protection may be included in one or more of the following messages:
  Register
  Diameter UAR (3GPP TS 29.272)
  Diameter MAR (3GPP TS 29.272)
  Diameter SAR (3GPP TS 29.272). In this message, instead of the protected pair of IMPU and IMPI, only the private (protected) IMPI may be transmitted.

In the respective return messages, the same private (protected) identifier may be used.

Another example where embodiments of the invention may be applied is MAP, as specified in 3GPP TS 29.002. MAP is the legacy protocol before 4G and 5G and is still used heavily and still enhanced. Also, some operators may have a mix of network nodes supporting MAP, in particular if it comes to roaming.

Figure 3:
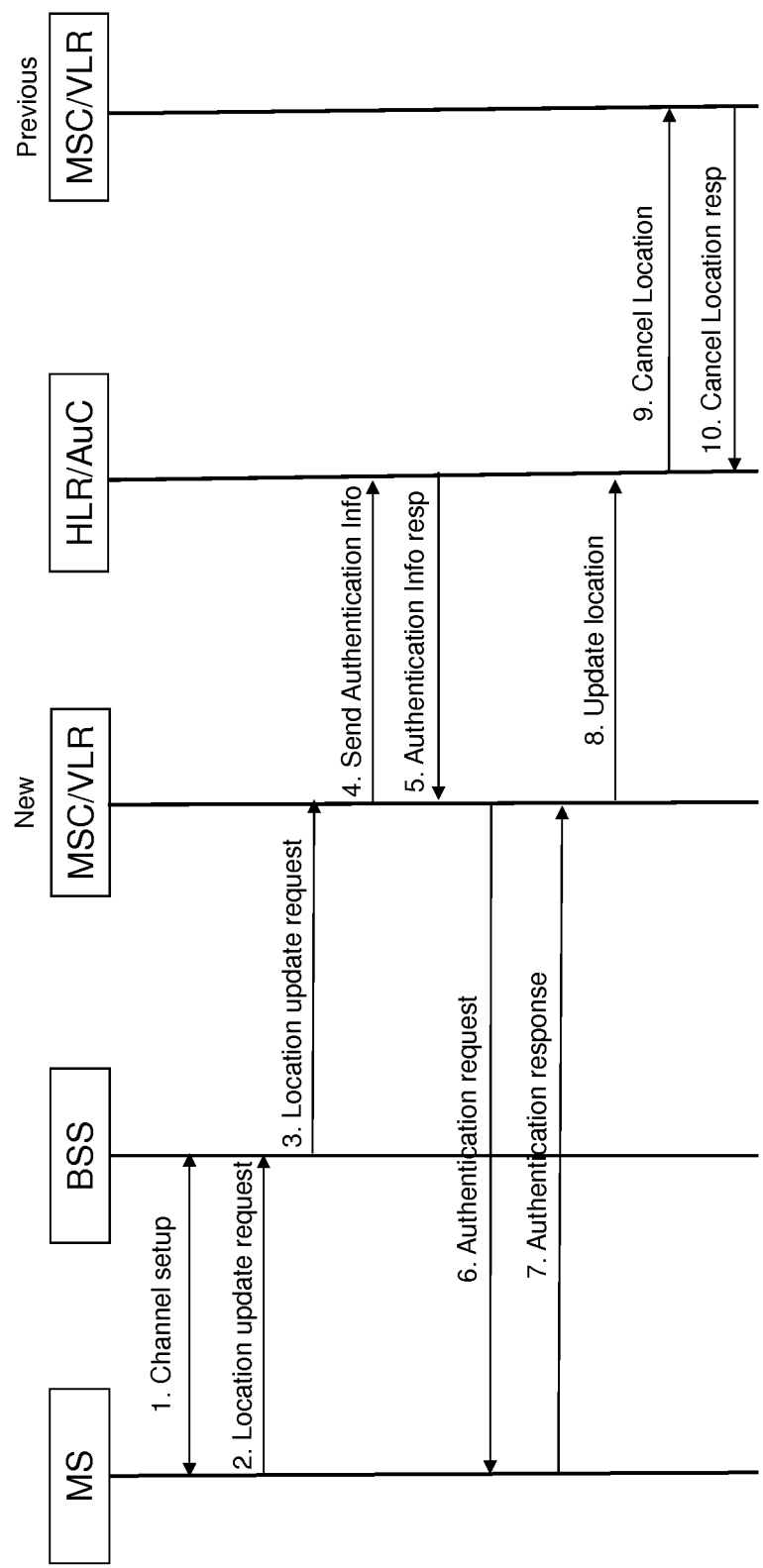
FIG. 3 shows a conventional location update procedure.

For MAP, the processing nodes of privacy protection are MSC and HLR instead of MME and HSS. Embodiments of the invention applied to MAP may operate correspondingly on the update location and the authentication info requests as described above. The classical message flow is shown in FIG. 3. Conventionally, the Location update request messages 2 and 3, the Authentication messages 6 and 7, and the Cancel location messages 9 and 10 comprise the IMSI. According to some embodiments of the invention, the IMSI in at least one of these message pairs is replaced by a privacy protected IMSI. Preferably, the IMSI in all of these message pairs is replaced by a privacy protected IMSI.

For the cancel location the HLR/HSS which is used to inform the previously serving nodes like MME or SGSN or MSC or VLR, that the user needs no longer to be handled by them (messages 9 and 10 in FIG. 3), the HSS/HLR needs to know what privacy protected identity was used with those nodes. Then the HSS/HLR can issue a cancel location with the used protected identity that the receiving node would understand.

Still another example where embodiments of the invention may be applied is delivery of short messages.

An SMSC in a network may receive a SMS for a user that is NOT in his network (a roaming user). In that case a SRI_SM (MAP) (see 3GPP TS 29.002) or a Diameter SRR (see 3GPP TS 29.272) message is sent to the home network to figure out where to deliver the SMS. The message contains conventionally the public identity of the SMS receiver i.e. MSISDN and then the IMSI is returned with the serving nodes (MSC, MME, SGSN). In some embodiments of the invention, instead of the IMSI, the private IMSI (protected IMSI) is returned instead.

There are similar other MAP related routing information SRI requests (also for GPRS etc) in TS 29.002, they would work the same way.

In some embodiments, the indication of the applied privacy protection may additionally contain information like timers, counters, or random values to enable a changing pseudonym. That is, in the example of AIR, the HSS may determine the IMSI based on the received protected IMSI, the stored mapping of IMSI and pseudonym, and the additional information comprised in the indication.

In some embodiments, the terminal may implement its functionality related to privacy protection in the baseband chip, or as part of the USIM application, or as part of the embedded UICC (eUICC) or integrated UICC (iUICC).

Figure 4:
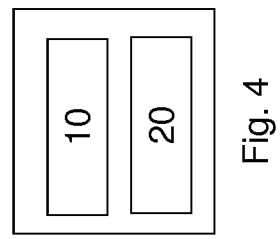
FIG. 4 shows an apparatus according to an embodiment of the invention.

FIG. 4 shows an apparatus according to an embodiment of the invention. The apparatus may be a terminal such as a UE or an element thereof. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises first instructing means 10 and second instructing means 20. Each of the first instructing means 10 and second instructing means 20 may be a first instructing processor and second instructing processor, respectively.

The first instructing means 10 instructs a subscription device to indicate an applied privacy protection to a visited network (S10). The indication of the applied privacy protection may comprise e.g. at least one of an indication that a privacy protection has been applied, an indication what privacy protection has been applied (e.g. an indication of the applied algorithm), and an indication of a parameter for the algorithm (e.g. random seed or similar). The visited network may be a HPLMN or a VPLMN where the subscription device tries to attach (or register) or is attached (or registered). A subscription device may be e.g. a UE or a MTC device.

The second instructing means 20 instructs the subscription device to provide a protected subscription identifier to the visited network (S20). The protected subscription identifier is based on a permanent subscription identifier protected according to the applied privacy protection. The protected subscription identifier may also be named a private subscription identifier. The privacy protection may comprise e.g. at least one of pseudonym based solution, an SN public key based solution, an HN public key based solution, and some other privacy solution.

S10 and S20 may be performed in any sequence or fully or partly in parallel to each other.

Figure 7:
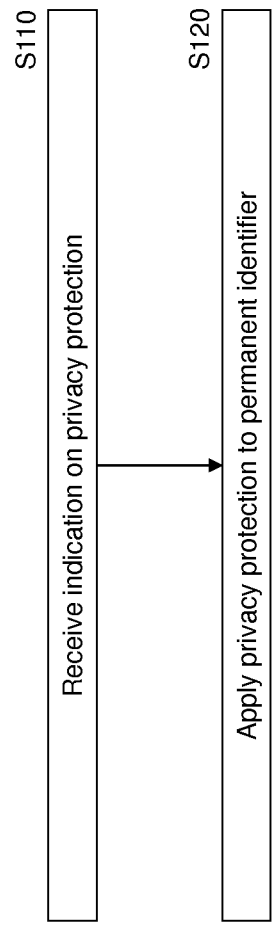
FIG. 7 shows a method according to an embodiment of the invention.
Figure 6:
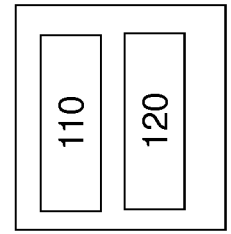
FIG. 6 shows an apparatus according to an embodiment of the invention.

FIG. 6 shows an apparatus according to an embodiment of the invention. The apparatus may be a subscription device such as a UE or an element thereof. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises receiving means 110 and instructing means 120. Each of the receiving means 110 and instructing means 120 may be a receiving processor and instructing processor, respectively.

The receiving means 110 receives an indication of an applied privacy protection from a visited network (S110). The indication of the applied privacy protection may comprise e.g. at least one of an indication that a privacy protection has to be applied, an indication what privacy protection has to be applied (e.g. an indication of the applied algorithm), and an indication of a parameter for the algorithm (e.g. random seed or similar). The visited network may be a HPLMN or a VPLMN where the subscription device tries to attach (or register) or is attached (or registered).

The instructing means 120 instructs a subscription device to provide a protected subscription identifier to the visited network (S120). The protected subscription identifier is based on a permanent subscription identifier protected according to the applied privacy protection. The privacy protection may be e.g. at least one of pseudonym based solution, an SN public key based solution, and a HN public key based solution. A subscription device may be e.g. a UE or a MTC device.

FIG. 8 shows an apparatus according to an embodiment of the invention. The apparatus may be a mobility entity such as a MME, MSC, S-CSCF, or an element thereof. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises receiving means 210 and instructing means 220. Each of the receiving means 210 and instructing means 220 may be a receiving processor and instructing processor, respectively.

The receiving means 210 receives an indication of an applied privacy protection from a subscription device (S210). The indication of the applied privacy protection may comprise e.g. at least one of an indication that a privacy protection has been applied, an indication what privacy protection has been applied (e.g. an indication of the applied algorithm), and an indication of a parameter for the algorithm (e.g. random seed or similar). A subscription device may be e.g. a UE or a MTC device.

The instructing means 220 instructs a mobility entity to handle a protected subscription identifier according to the applied privacy protection (S220). The protected subscription identifier is received from the subscription device. The protected subscription identifier may be received before, in parallel with, or after the indication of the applied privacy protection. The privacy protection may be e.g. at least one of pseudonym based solution, an SN public key based solution, and a HN public key based solution. A subscription device may be e.g. a UE or a MTC device. The handling may comprise e.g. forwarding the protected subscription identifier to a subscription server predetermined for the apparatus (e.g. a HSS of the VPLMN the apparatus belongs to), or forwarding the protected subscription identifier to a subscription server identified based on the received protected subscription identifier (e.g. a HSS of the HPLMN of the subscription device). The handling may include forwarding of the indication of the applied privacy protection.

FIG. 10 shows an apparatus according to an embodiment of the invention. The apparatus may be a mobility entity such as a MME, MSC, S-CSCF, or an element thereof. FIG. 11 shows a method according to an embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises first instructing means 310 and second instructing means 320. Each of the first instructing means 310 and second instructing means 320 may be a first instructing processor and second instructing processor, respectively.

The first instructing means 310 instructs a mobility entity to provide an indication of an applied privacy protection to a subscription device (S310). The indication of the applied privacy protection may comprise e.g. at least one of an indication that a privacy protection has been applied, an indication what privacy protection has been applied (e.g. an indication of the applied algorithm), and an indication of a parameter for the algorithm (e.g. random seed or similar). A subscription device may be e.g. a UE or a MTC device.

The instructing means 320 instructs the mobility entity to handle a protected subscription identifier according to the applied privacy protection (S320). The protected subscription identifier is received from the subscription device. The privacy protection may be e.g. at least one of pseudonym based solution, an SN public key based solution, and a HN public key based solution. A subscription device may be e.g. a UE or a MTC device. The handling may comprise e.g. forwarding the protected subscription identifier to a subscription server predetermined for the apparatus (e.g. a HSS of the VPLMN the apparatus belongs to), or forwarding the protected subscription identifier to a subscription server identified based on the received protected subscription identifier (e.g. a HSS of the HPLMN of the subscription device). The handling may include forwarding of the indication of the applied privacy protection.

Figure 13:
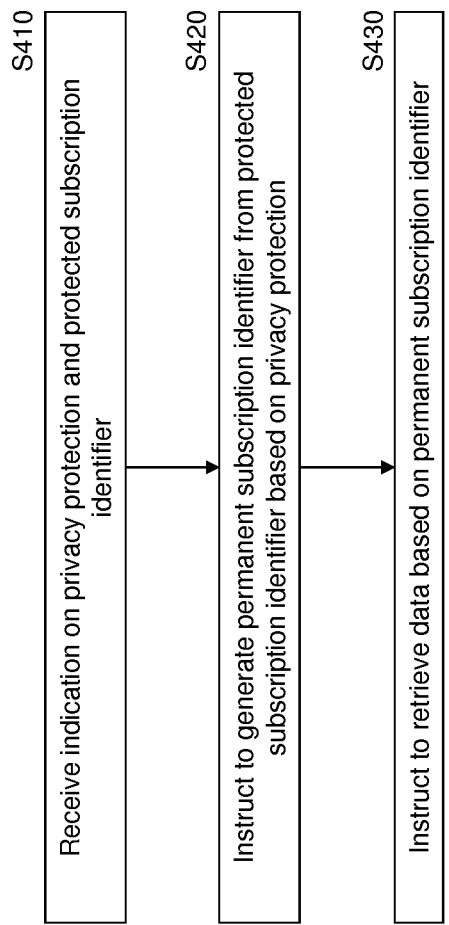
FIG. 13 shows a method according to an embodiment of the invention.
Figure 12:
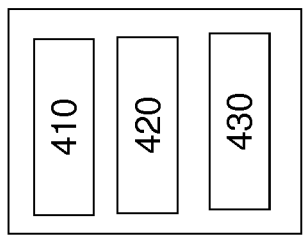
FIG. 12 shows an apparatus according to an embodiment of the invention.

FIG. 12 shows an apparatus according to an embodiment of the invention. The apparatus may be a subscription server such as a HSS or HLR, or an element thereof. FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises receiving means 410, first instructing means 420 and second instructing means 430. Each of the receiving means 410, first instructing means 420 and second instructing means 430 may be a receiving processor, first instructing processor, and second instructing processor, respectively.

The receiving means 410 receives a protected subscription identifier and an indication of an applied privacy protection (S410). The indication of the applied privacy protection may comprise e.g. at least one of an indication that a privacy protection has been applied, an indication what privacy protection has been applied (e.g. an indication of the applied algorithm), and an indication of a parameter for the algorithm (e.g. random seed or similar). The protected subscription identifier may be received before, in parallel with, or after the indication of the applied privacy protection.

The first instructing means 420 instructs a subscription server to generate a permanent subscription identifier from the protected subscription identifier according to the applied privacy protection (S420). The privacy protection may be e.g. at least one of pseudonym based solution, an SN public key based solution, and a HN public key based solution.

The second instructing means 430 instructs the subscription server to retrieve data from a database based on the permanent subscription identifier (S430).

Figure 14:
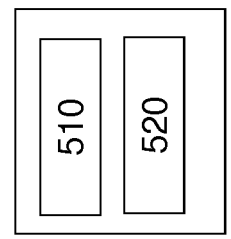
FIG. 14 shows an apparatus according to an embodiment of the invention.

FIG. 14 shows an apparatus according to an embodiment of the invention. The apparatus comprises at least one processor 510, at least one memory 520 including computer program code, and the at least one processor 510, with the at least one memory 520 and the computer program code, being arranged to cause the apparatus to at least perform at least one of the methods according to FIGS. 5, 7, 9, 11, and 13.

One piece of information may be transmitted in one or plural messages from one entity to another entity. Each of these messages may comprise further (different) pieces of information.

Instead of the IMSI, another permanent subscription identifier may be privacy protected by one or more different privacy protection methods. For example, IMPI, IMPU, and SUPI of 3GPP $5^{th}$ generation may be such a permanent subscription identifier. Some embodiments of the invention may be applied preferably to non-public permanent subscription identifiers (such as IMSI, IMPI) but may be applied to public identifiers, too (such as MSISDN, IMPU).

Names of network elements, protocols, and methods are based on current standards. In other versions or other technologies, the names of these network elements and/or protocols and/or methods may be different, as long as they provide a corresponding functionality.

A subscription device may be a terminal, a UE, a UICC, a eUICC, a MTC device, a mobile station, a SIM card, a USIM card, etc, or any other device related to a subscription in a (mobile or fixed) communication network. Unless otherwise indicated or made clear from the context, if the description is related to one of these devices (e.g. to a UE), it is to be read as one example of a subscription device and may be replaced by any other subscription device.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a subscription device such as a UE or a MTC device, or a component thereof such as a UICC or eUICC, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a mobility entity such as a MME, MSC, or S-CSCF, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a subscription database such as a HSS, HLR, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments of the invention may be implemented in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus associated with a subscription device, the apparatus comprising at least one processor, and at least one memory including computer program code, and the at least one processor, with the at least one memory and the computer program code, being arranged to cause the apparatus to at least:
   receive a capability indication indicating that a visited network is capable of applying one or more privacy protections;
   check if the subscription device is capable of applying at least one of the one or more privacy protections;
      in an instance the subscription device is capable of applying at least one of the one or more privacy protections, select one of the one or more privacy protections which the subscription device is capable of applying as the applied privacy protection;
   instruct the subscription device to indicate the applied privacy protection to the visited network; and
   instruct the subscription device to provide a protected subscription identifier to the visited network, wherein the protected subscription identifier is based on a permanent subscription identifier protected according to the applied privacy protection.

2. The apparatus according to claim 1, wherein the protecting according to the applied privacy protection comprises providing a pseudonym representative of the permanent subscription identifier.

3. The apparatus according to claim 1, wherein the protecting according to the applied privacy protection comprises encrypting the permanent subscription identifier by a key.

4. The apparatus according to claim 3, wherein either the key is received from the visited network or the key is received from a home network.

5. An apparatus associated with a subscription device, the apparatus comprising at least one processor, and at least one memory including computer program code, and the at least one processor, with the at least one memory and the computer program code, being arranged to cause the apparatus to:
   instruct the subscription device to provide a capability indication to a visited network, wherein the capability indication indicates one or more privacy protections of which the subscription device is capable;
   receive an indication of an applied privacy protection from the visited network; and
   instruct the subscription device to provide a protected subscription identifier to the visited network, wherein the protected subscription identifier is based on a permanent subscription identifier protected according to the applied privacy protection.

6. An apparatus associated with a mobility entity, the apparatus comprising at least one processor, and at least one memory including computer program code, and the at least one processor, with the at least one memory and the computer program code, being arranged to cause the apparatus to:
   instruct the mobility entity to provide a capability indication to a subscription device, wherein the capability indication indicates one or more privacy protections of which the mobility entity is capable;
   receive a first indication of an applied privacy protection from the subscription device; and
   instruct the mobility entity to handle a protected subscription identifier according to the applied privacy protection, wherein the protected subscription identifier is received from the subscription device.

7. The apparatus according to claim 6, wherein the handling according to the selected privacy protection comprises
   determining a home subscription server indicated in the protected subscription identifier;
   forwarding the protected subscription identifier to the home subscription server.

8. The apparatus according to claim 7, wherein the at least one processor, with the at least one memory and the computer program code, being arranged to cause the apparatus to further perform
   instructing the mobility entity to forward a second indication of the applied privacy protection to the home subscription server.

9. The apparatus according to claim 6, wherein the handling according to the applied privacy protection comprises forwarding the protected subscription identifier to a predetermined visited subscription server.

10. An apparatus associated with a mobility entity, the apparatus comprising at least one processor, and at least one memory including computer program code, and the at least one processor, with the at least one memory and the computer program code, being arranged to cause the apparatus to:

receive a capability indication from a subscription device, wherein the capability indication indicates one or more privacy protections of which the subscription device is capable;

check if the mobility entity is capable of applying at least one of the one or more privacy protections;

in an instance the mobility entity is capable of applying at least one of the one or more privacy protections, select one of the one or more privacy protections of which the mobility entity is capable as the applied privacy protection;

instruct the mobility entity to provide a first indication of an applied privacy protection to the subscription device; and instruct the mobility entity to handle a protected subscription identifier according to the applied privacy protection, wherein the protected subscription identifier is received from the subscription device.

11. A method, comprising:

receiving a capability indication indicating that a visited network is capable of applying one or more privacy protections;

checking if the subscription device is capable of applying at least one of the one or more privacy protections;

in an instance the subscription device is capable of applying at least one of the one or more privacy protections, selecting one of the one or more privacy protections of which the subscription device is capable as the applied privacy protection;

instructing the subscription device to indicate an applied privacy protection to the visited network; and instructing the subscription device to provide a protected subscription identifier to the visited network, wherein the protected subscription identifier is based on a permanent subscription identifier protected according to the applied privacy protection.

12. A method, comprising:

instructing a subscription device to provide a capability indication to a visited network, wherein the capability indication indicates one or more privacy protections of which the subscription device is capable;

receiving an indication of an applied privacy protection from the visited network; and instructing the subscription device to provide a protected subscription identifier to the visited network, wherein the protected subscription identifier is based on a permanent subscription identifier protected according to the applied privacy protection.

* * * * *